(12) United States Patent
Witz et al.

(10) Patent No.: US 8,720,066 B2
(45) Date of Patent: May 13, 2014

(54) HOSE

(71) Applicant: BHP Billiton Petroleum Pty Ltd, Melbourne (AU)

(72) Inventors: Joel Aron Witz, Newdigate (GB); David Cox, Hertford (GB); Gerard Anthony Hall, Little Sutton (GB); Richard Smith, London (GB)

(73) Assignee: BHP Billiton Petroleum Pty Ltd., Melbourne (AU)

( * ) Notice: Subject to any disclaimer, the term of this patent is extended or adjusted under 35 U.S.C. 154(b) by 12 days.

(21) Appl. No.: 13/656,845

(22) Filed: Oct. 22, 2012

(65) Prior Publication Data

US 2013/0042478 A1 Feb. 21, 2013

Related U.S. Application Data

(62) Division of application No. 12/300,267, filed on May 15, 2009.

(30) Foreign Application Priority Data

| May 8, 2006 | (GB) | ................................... 0609081.5 |
| May 8, 2006 | (GB) | ................................... 0609083.1 |
| May 8, 2007 | (WO) | ................ PCT/GB2007/001695 |

(51) Int. Cl.
*B21D 51/16* (2006.01)

(52) U.S. Cl.
USPC ........................................ 29/890.144; 29/423

(58) Field of Classification Search
USPC ............................................. 29/890.114, 423
See application file for complete search history.

(56) References Cited

U.S. PATENT DOCUMENTS

| 956,076 | A | 4/1910 | Greenfield |
| 1,178,559 | A | 4/1916 | Vautier |
| 1,588,606 | A | 6/1926 | Oden |
| 1,599,775 | A | 9/1926 | Lamb et al. |
| 1,607,909 | A | 11/1926 | Oden |

(Continued)

FOREIGN PATENT DOCUMENTS

| CN | 1441884 | 9/2003 |
| CN | 1732352 | 2/2006 |

(Continued)

OTHER PUBLICATIONS

International Preliminary Report for PCT Application No. PCT/GB01/02562, dated Sep. 16, 2002.*

(Continued)

*Primary Examiner* — David Bryant
*Assistant Examiner* — Ruth G Hidalgo-Hernandez
(74) *Attorney, Agent, or Firm* — Brinks Gilson & Lione; G. Peter Nichols (57) ABSTRACT

The invention relates to a bellows hose, which is capable of being used without leakage, and which has a longer length and/or diameter than has been previously achievable. A bellows hose comprises an inner tubular bellows and an outer tubular bellows. An insulation layer is provided between the bellows. An armoured layer is provided around the outer bellows, to improve the insulation further. The hose can have length above 30 m and a diameter above 400 mm. A method of, and apparatus for, making the hose are also described, which involves the use of a non-metallic mandrel.

13 Claims, 4 Drawing Sheets

(56) References Cited

U.S. PATENT DOCUMENTS

| | | | |
|---|---|---|---|
| 1,785,345 | A | 12/1930 | Hasemann |
| 1,810,032 | A | 6/1931 | Schulthess |
| 1,901,330 | A | 3/1933 | Poberejsky |
| 1,911,486 | A | 5/1933 | Bacheldor et al. |
| 2,011,781 | A | 8/1935 | Tabozzi |
| 2,184,984 | A | 12/1939 | Van Stone et al. |
| 2,371,363 | A | 3/1945 | Smith |
| 2,610,869 | A | 9/1952 | Percy |
| 2,661,026 | A | 12/1953 | Schulthess |
| 2,706,494 | A | 4/1955 | Morse |
| 2,825,364 | A | 3/1958 | Cullen et al. |
| 2,829,671 | A | 4/1958 | Ernst et al. |
| 2,858,147 | A | 10/1958 | Guarnaschelli |
| 2,940,778 | A | 6/1960 | Kaiser |
| 3,004,779 | A | 10/1961 | Cullen et al. |
| 3,140,106 | A | 7/1964 | Thomas et al. |
| 3,189,370 | A | 6/1965 | Marshall |
| 3,240,234 | A | 3/1966 | Bond, Jr. et al. |
| 3,240,643 | A * | 3/1966 | Clark et al. .................. 156/143 |
| 3,287,194 | A * | 11/1966 | Waddell, Jr. .................. 156/144 |
| 3,318,620 | A | 5/1967 | Cullen et al. |
| 3,333,325 | A | 8/1967 | Stanley |
| 3,462,177 | A | 8/1969 | Skinner et al. |
| 3,538,728 | A | 11/1970 | Tribey |
| 3,603,719 | A | 9/1971 | Lejeune |
| RE28,155 | E | 9/1974 | Dow et al. |
| 3,856,052 | A | 12/1974 | Feucht |
| 3,919,026 | A | 11/1975 | Mizutani et al. |
| 4,033,612 | A | 7/1977 | Chevalier |
| 4,063,757 | A | 12/1977 | Fuhrmann |
| 4,303,105 | A | 12/1981 | Rohner |
| 4,323,089 | A | 4/1982 | Kadono et al. |
| 4,330,143 | A | 5/1982 | Reneau |
| 4,344,908 | A | 8/1982 | Smith et al. |
| 4,351,366 | A | 9/1982 | Angioletti |
| 4,377,186 | A | 3/1983 | Genini et al. |
| 4,411,845 | A | 10/1983 | Tanahashi |
| 4,422,993 | A | 12/1983 | Smith et al. |
| 4,430,383 | A | 2/1984 | Smith et al. |
| 4,436,689 | A | 3/1984 | Smith et al. |
| 4,445,543 | A | 5/1984 | Mead |
| 4,570,678 | A | 2/1986 | Ziemek et al. |
| 4,634,153 | A | 1/1987 | Kishton |
| 4,826,354 | A | 5/1989 | Adorian |
| 4,924,679 | A | 5/1990 | Bringham |
| 4,950,001 | A | 8/1990 | Briggs |
| 4,984,605 | A | 1/1991 | Schippl |
| 5,182,147 | A | 1/1993 | Davis |
| 5,192,384 | A * | 3/1993 | Barrier et al. .................. 156/189 |
| 5,480,193 | A | 1/1996 | Echols et al. |
| 5,485,870 | A | 1/1996 | Kraik |
| 5,600,752 | A | 2/1997 | Lopatinsky |
| 5,639,128 | A | 6/1997 | Belcher |
| 5,647,563 | A | 7/1997 | Gantner et al. |
| 5,685,576 | A | 11/1997 | Wolfe et al. |
| 5,698,278 | A | 12/1997 | Emond et al. |
| 5,860,682 | A | 1/1999 | Belcher |
| 5,893,681 | A | 4/1999 | Boden et al. |
| 6,110,550 | A | 8/2000 | Jarrin et al. |
| 6,334,466 | B1 | 1/2002 | Jani et al. |
| 6,659,510 | B1 | 12/2003 | Machino et al. |
| 6,732,765 | B2 | 5/2004 | Schippl et al. |
| 6,874,542 | B2 | 4/2005 | Mayau et al. |
| 6,883,549 | B2 | 4/2005 | Schippl |
| 6,923,477 | B2 | 8/2005 | Buon et al. |
| 7,243,686 | B2 | 7/2007 | Burke et al. |
| 7,681,599 | B2 | 3/2010 | Lange et al. |
| 7,712,792 | B2 | 5/2010 | Burke et al. |
| 7,735,524 | B2 | 6/2010 | Burke et al. |
| 7,743,792 | B2 | 6/2010 | Burke et al. |
| 2003/0178085 | A1* | 9/2003 | Burke et al. .................. 138/138 |
| 2003/0217779 | A1 | 11/2003 | Schippl |
| 2004/0066035 | A1 | 4/2004 | Buon et al. |
| 2004/0112454 | A1 | 6/2004 | Takagi |
| 2004/0146676 | A1 | 7/2004 | Ikemoto |
| 2004/0256016 | A1* | 12/2004 | Arima et al. .................. 138/126 |
| 2005/0173227 | A1* | 8/2005 | Adamski et al. .................. 198/579 |
| 2007/0024051 | A1 | 2/2007 | Witz et al. |
| 2009/0320951 | A1 | 12/2009 | Witz et al. |
| 2010/0059133 | A1 | 3/2010 | Witz et al. |
| 2010/0180976 | A1 | 7/2010 | Witz et al. |
| 2010/0183371 | A1 | 7/2010 | Witz et al. |
| 2010/0224277 | A1 | 9/2010 | Witz et al. |
| 2010/0229991 | A1 | 9/2010 | Witz et al. |
| 2010/0229992 | A1 | 9/2010 | Witz et al. |

FOREIGN PATENT DOCUMENTS

| | | |
|---|---|---|
| DE | 1 425 453 | 7/1969 |
| DE | 2 431 277 | 1/1975 |
| DE | 2 948 416 | 6/1981 |
| DE | 3 440 459 | 5/1986 |
| DE | 9 207 276 | 10/1992 |
| DE | 9 407 409 | 7/1994 |
| DE | 10 2005 046367 | 4/2006 |
| EP | 0 032 352 | 7/1981 |
| EP | 0 076 540 | 4/1983 |
| EP | 0 183 285 | 4/1986 |
| EP | 0 241 656 | 10/1987 |
| EP | 0 215 507 | 11/1989 |
| EP | 0 438 831 | 8/1995 |
| EP | 0 264 587 | 4/1998 |
| EP | 0 855 496 | 7/1998 |
| EP | 0 895 013 | 5/2000 |
| EP | 0 833 769 | 10/2001 |
| EP | 1 288 558 | 3/2003 |
| EP | 1 344 969 | 9/2003 |
| EP | 1 428 748 | 6/2004 |
| FR | 1499956 | 4/1966 |
| FR | 2194906 | 3/1974 |
| FR | 2235324 | 6/1974 |
| FR | 2753257 | 3/1998 |
| GB | 323352 | 1/1930 |
| GB | 550543 | 1/1943 |
| GB | 591307 | 8/1947 |
| GB | 591560 | 8/1947 |
| GB | 741643 | 12/1955 |
| GB | 849121 | 9/1960 |
| GB | 850131 | 9/1960 |
| GB | 895553 | 5/1962 |
| GB | 1019370 | 2/1966 |
| GB | 1034956 | 7/1966 |
| GB | 1312509 | 4/1973 |
| GB | 1383313 | 2/1974 |
| GB | 1477433 | 6/1977 |
| GB | 2070725 | 9/1981 |
| GB | 2104992 | 3/1983 |
| GB | 2104996 | 3/1983 |
| GB | 2107819 | 5/1983 |
| GB | 2186657 | 8/1987 |
| GB | 2223817 | 4/1990 |
| GB | 2289107 | 11/1995 |
| GB | 2303574 | 2/1997 |
| GB | 2312725 | 11/1997 |
| GB | 2339251 | 1/2000 |
| GB | 2363440 | 12/2001 |
| GB | 2366345 | 3/2002 |
| GB | 2408307 | 5/2005 |
| JP | 1283494 | 11/1989 |
| JP | 03075132 | 3/1991 |
| JP | 08011138 | 1/1996 |
| JP | 08336845 | 12/1996 |
| JP | 11325333 | 11/1999 |
| SU | 396271 | 8/1973 |
| WO | WO 93/24731 | 12/1993 |
| WO | WO 96/36592 | 11/1996 |
| WO | WO 97/00805 | 1/1997 |
| WO | WO 01/96772 | 12/2001 |
| WO | WO 2004/044472 | 5/2004 |
| WO | WO 2004/079248 | 9/2004 |
| WO | WO 2005/119150 | 12/2005 |
| WO | WO 2006/044053 | 4/2006 |
| WO | WO 2007/129092 | 11/2007 |

(56) References Cited

FOREIGN PATENT DOCUMENTS

| WO | WO 2009/034340 | 3/2009 |
|---|---|---|
| WO | WO 2009/034357 | 3/2009 |
| WO | WO 2009/034364 | 3/2009 |

OTHER PUBLICATIONS

Patent Application entitled, "Improvements Relating to Pipe", by Joel Aron Witz filed on Mar. 12, 2010 as U.S. Appl. No. 12/677,852.
Patent Application entitled, "Improvements Relating to Hose End Fittings", by Joel Aron Witz filed on Jun. 15, 2010 as U.S. Appl. No. 12/667,853.
Patent Application entitled, "Hose", by Joel Aron Witz filed on Jun. 10, 2010 as U.S. Appl. No. 12/667,854.
International Search Report and Written Opinion for PCT Application Application Serial No. PCT/GB2008/003098, dated Dec. 12, 2008, 6 pages.
International Preliminary Report on Patentability for PCT Application Serial No. PCT/GB2008/003098, dated Mar. 16, 2010, 5 pages.
International Search Report and Written Opinion for PCT Application Serial No. PCT/GB2008/003135, dated Dec. 12, 2008, 7 pages.
International Preliminary Report on Patentability for PCT Application Serial No. PCT/GB2008/003135, dated Mar. 16, 2010, 6 pages.
International Search Report and Written Opinion for PCT Application Serial No. PCT/GB2008/003121, dated Dec. 15, 2008, 10 pages.
International Primary Report on Patentability for PCT Application Serial No. PCT/GB2008/003121, dated Mar. 16, 2010, 7 pages.
International Search Report for PCT Application Serial No. PCT/GB01/02562, Sep. 16, 2002.
International Preliminary Examination Report for PCT Application Serial No. PCT/GB01/02562, published on Dec. 20, 2001.
International Preliminary Report on Patentability for PCT Application Serial No. PCT/GB07/002446, dated Jan. 15, 2009.
International Preliminary Report on Patentability and Written Opinion for PCT Application Serial No. PCT/GB2007/003063, dated Feb. 26, 2009.
International Preliminary Report on Patentability and Written Opinion for PCT Application Serial No. PCT/GB2007/003058, dated Feb. 26, 2009.
Translation of Office Action for Chinese Patent Application Serial No. 2007800216292, dated Mar. 10, 2010, 9 pages.
Translation of Office Action for Chinese Patent Application Serial No. 2007800378028, dated Mar. 8, 2010, 8 pages.
Translation of Office Action for Chinese Patent Application Serial No. 2007800378136, dated Mar. 10, 2010, 6 pages.
Translation of Decision of Rejection for Chinese Patent Application Serial No. 2007800378136 dated Nov. 12, 2010, 8 pages.

\* cited by examiner

HOSE

This application is a divisional of U.S. application Ser. No. 12/300,267 and claims priority to International Application No. PCT/GB/2007/001695 filed on May 8, 2007 and to GB Application No. 0609081.5 filed May 8, 2006 and also to GB Application No. 0609083.1 filed May 8, 2006, the entire contents of each are incorporated herein by reference.

BACKGROUND

This invention relates to hose, and more particularly relates to long length hose, and to a method of and apparatus for making long length hose. The invention is especially concerned with hose which can be used in cryogenic conditions.

Typical applications for hose involve the pumping of fluids from a fluid reservoir under pressure. Examples include supplying of domestic heating oil or LPG to a boiler; transporting produced oilfield liquids and/or gases from a fixed or floating production platform to the cargo hold of a ship, or from a ship cargo hold to a land-based storage unit; delivering of fuel to racing cars, especially during refueling in formula 1; and conveying corrosive fluids, such as sulphuric acid.

It is well known to use hose for the transport of fluids, such as liquefied gases, at low temperature. Such hose is commonly used to transport liquefied gases such as liquefied natural gas (LNG) and liquefied propane gas (LPG).

Many applications of hose require the hose to be supported along its length. This especially applies to the transport of the produced liquids and/or gases mentioned above. Without additional support, conventional hose is often incapable of supporting its own weight, or the weight of the fluid contained therein.

Three main types of hose exist that are used for large bore applications for transferring fluids at elevated pressure (e.g. at least 2 barg). These are:

1. Rubber (rubber wraps vulcanised to form the hose body).
2. Bellows (convoluted steel tube).
3. Composite (films and fabrics between two helical wires).

The present invention is directed to bellows hoses. Rubber hoses differ from composite and bellows hose in that they do not have a steel component on the inner surface.

Rubber hoses are typically manufactured by wrapping numerous layers of rubber materials and some steel and fabric layers around a mandrel coated with a release agent. Some Rubber Hoses use an extruded rubber inner liner on a mandrel as the innermost layer and then wrap after that. Other rubber hoses include an interlocked carcass inside the liner, for collapse resistance. The complete structure is then vulcanised thus bonding the rubber wraps together. The complete hose assembly, including the end fittings which are also on the mandrel and are wrapped into the hose body structure, is removed from the mandrel by pulling and rotating. The hose and mandrel are supported by a series of rollers during this extraction process. Rubber hoses are typically made in lengths of up to 12 m and bores of up to at least 1.2 m.

In essence, the traditional method of manufacture for the bellows and composite hose is the same as that of a rubber hose. A bellows hose is formed in sections supported on steel mandrel and if insulating or protective layers are required these will be wrapped around the bellows tube. A composite hose is traditionally formed by a steel wire being wound helically onto a steel mandrel followed by a number of film and fabric layers. This is then formed into the hose body by the application of a second helical wire.

Both bellows and composite hoses are widely available in bores of up to 200 mm and in lengths of up to about 30 m. However it is difficult to manufacture and extract a large bore hose, greater than 400 mm, of either of these types in a reasonable length, greater than 10 m, using the traditional manufacturing techniques. This is not the case with rubber hoses as they do not have an inner steel component.

Both bellows and composite hoses are currently manufactured on steel mandrels, which for small diameters works well and is the industry standard; but as the diameter increases the effect of friction is increased dramatically. The surface area of contact between the hose and the mandrel increases linearly with diameter but the weight of the mandrel increases approximately with the square of the diameter. The product of these two factors is the friction between the hose and mandrel as during extraction the weight of the mandrel is taken through the hose.

Other factors affecting the ease of extraction include:
Galling between the steel mandrel and the steel wire.
The coefficient of friction between the two materials.
The weight of the hose.
The use of supporting rollers used to control mandrel deflection.

Attempts to manufacture hoses using the traditional techniques have resulted in hoses that have the required bore but are too short, or have the required bore and length but have been damaged during extraction. It has also been the case that the mandrel has become damaged during extraction and so in an industrial setting this process would be impractical and uneconomic.

Bellows hose is described in many prior art documents, including, for example,

US2004112454 and US2004146676. As discussed above, bellow hose is characterised by an inner metallic inner structure which is difficult to remove from the mandrel during the manufacturing process. As a result there is a practical limit on the size of hose which can be produced in the prior art, while at the same time retaining the ability to operate in hostile environments, such as in conditions of low and high temperature; and in marine applications. Flexible tubing is also described in U.S. Pat. No. 3,538,728, U.S. Pat. No. 5,893,681 and SU396271.

GB2303574, DE2948416, JP08336845, JP08011138 and JP03075132 disclose a method of making hose or tubing, but they do not disclose the manufacture of bellows hose.

Bellows hose is exclusively manufactured on a metallic mandrel; the mandrel may consist exclusively of the stainless steel or may be clad with stainless steel. In 2005, a carbon steel mandrel might typically cost about: £25,000 and in its working lifetime it would be capable of being used to manufacture about 25-30 individual hoses. However, there is a problem with carbon steel mandrels, as the metallic inner member of the hose is often made of stainless steel. When such hose is manufactured using a carbon steel mandrel, part of the carbon steel can be transferred to the surface of the stainless steel inner member; this causes a site for corrosion of the inner member, which can lead to rapid failure in extreme environments. For this reason, the mandrel used in the manufacture of bellows hose and composite hose usually has to be made of stainless steel. A stainless steel hose costs three to four times as much as a carbon steel mandrel.

We have now found an improved way of manufacturing hose, which makes it possible to manufacture useful hose in lengths and diameters that have not previously been attainable. Thus, the invention encompasses a method of manufacturing hose, an apparatus for manufacturing hose, and hose per se.

According to one aspect of the invention, there is provided a hose comprising a tubular hose portion extending continuously between two end fittings, wherein said tubular hose portion comprises a plurality of tubular corrugated or convoluted sections secured end to end and at least one protective and/or reinforcing layer disposed around said corrugated or convoluted sections, wherein the internal diameter of the hose portion is at least 200 mm and the length of the hose portion is at least 30 m.

It will be appreciated that the hose portion extends continuously between the end fittings. Thus, the hose according to the invention is distinct from prior art hose comprising shorter lengths of hose which are attached together in sequence by attaching the end fittings together.

In a preferred embodiment, the length of the hose portion is at least 31 m, more preferably at least 32 m. The hose portion is desirably at least 35 m in length. The length of the hose portion may be much longer than 30 m, depending on the requirements. Thus, the hose portion may have a length of up to 50 m or even up to 60 m. The length of the hose portion will typically lie within the ranges discussed above, subject to the minimum of at least 30 m.

The inner diameter of the hose portion is preferably at least 100 mm, or at least 150 mm, or at least 200 mm, or at least 250 mm, more preferably at least 300 mm, and still more preferably at least 350 mm and most preferably at least 400 mm. In accordance with preferred embodiments of the invention, the hose portion inner diameter may be at least 450 mm, at least 500 mm, at least 550 mm or at least 600 mm. It is unlikely to be desirable for the hose portion diameter to exceed 750 mm, and typically the hose diameter would not exceed 600 mm.

Most preferably the hose portion has a length of from 30 m or 35 m up to about 50 m, in combination with an inner diameter from 200 mm to 600 mm, preferably from 300 mm to 600 mm, most preferably 400 mm to 600 mm.

According to another aspect of the invention, there is provided a hose comprising a tubular hose portion extending continuously between two end fittings, wherein said tubular hose portion comprises a plurality of tubular corrugated or convoluted sections secured end to end and at least one protective and/or reinforcing layer disposed around said corrugated or convoluted sections, wherein the internal diameter of the hose portion is at least 300 mm and the length of the hose portion is at least 5 m.

In a preferred embodiment, the length of the hose portion is at least 8 m, more preferably at least 10 m, more preferably at least 15 m, still more preferably at least 20 m, or at least 25 m. In particularly preferred embodiments, the hose portion may be at least 30 m in length. The length of the hose portion may be much longer than 30 m, depending on the requirements. Thus, the hose portion may have a length of up to 50 m or even up to 60 m.

The inner diameter of the hose portion is preferably at least preferably at least 350 mm and most preferably at least 400 mm. In accordance with preferred embodiments of the invention, the hose portion inner diameter may be at least 450 mm, at least 500 mm, at least 550 mm or at least 600 mm. It is unlikely to be desirable for the hose portion diameter to exceed 750 mm, and typically the hose portion diameter would not exceed 600 mm.

Most preferably the hose portion has a length of from 8 m or 10 m up to about 50 m, in combination with an inner diameter from 400 mm to 600 mm.

The inner diameter of the hose portion according to the invention corresponds to the outer diameter of the non-metallic mandrel on which it was formed. The length of the hose portion corresponds to the distance between the end fittings immediately after manufacture of the hose. It should also be noted, that owing to the nature of the materials and the manufacturing process, the hose dimensions would usually be subject to a tolerance of about +/−3%.

It is important to understand that the present invention provides a working bellows hose having a length and/or diameter which is greater than that which has been possible in accordance with the prior art. There may be examples in the prior art of hose which has a diameter and/or length within the ranges described above, but such hoses are not working hoses, i.e., they would not be able to operate under their normal operating pressure without leaking.

The hose according to the invention may have a high or low working temperature, including a cryogenic working temperature.

For example, when the hose is intended for use at high temperatures, the working temperature of the hose may be at least 40° C., or at least 60° C., or at least 80° C. or at least 100° C., up to a maximum of 200° C. or 300° C.

When the hose is intended for use at low temperatures, the working temperature of the hose may be from 0° C. down to −200° C. or −220° C. Typically the working temperature is −20° C. or below, −40° C. or below, −60° C. or below, or −80° C. or below. For cryogenic applications, the working temperature will typically be from −100° C. to −170° C., −200° C. or −220° C. A working temperature range from −100° C. to −220° C. is suitable for most cryogenic applications, including the transportation of LNG, liquid oxygen (bp −183° C.) or liquid nitrogen (bp −196° C.).

In general, the working pressure of the hose is be in the range from about 500 kPa gauge, or 1,000 kPa gauge, up to about 2,000 kPa gauge, or possibly up to about 2,500 kPa gauge. These pressures relate to the operating pressure of the hose, not the burst pressure (which must be several times greater).

The working volumetric flow rate depends upon the fluid medium, the pressure and the inner diameter. Working flowrates from 1,000 m$^3$/h up to 12,000 m$^3$/h are typical.

A preferred working temperature and pressure would be from −100° C. to −200° C. at a pressure from 500 kPa gauge, preferably 1,000 kPa gauge, up to 2,000 kPa gauge or 2,500 kPa gauge.

The hose according to the invention can also be provided for use with corrosive materials, such as strong acids.

According to another aspect of the invention there is provided the use of the hose described above in the working temperature, working pressure, and/or working flowrates described above to transport a liquid through the hose without any leakage of the liquid through the hose.

The convoluted or corrugated sections may be sinusoidal, U-shaped or shaped like the Greek letter omega, $\Omega$. The convolutions or corrugations may be circumferential arranged along the length of each section, or may be arranged in a spiral along the length of each section. In general, only the sinusoidal convolutions are arranged in a spiral.

A sufficient number of convoluted or corrugated sections will be provided (e.g., 3, 4, 5, etc.) to create a hose of the desired length.

In an embodiment, the hose includes a second layer comprising a plurality of convoluted or corrugated sections arranged around the first layer of convoluted or corrugated sections.

The hose preferably includes at least one reinforcing layer, and at least one protective layer, which is typically the outer layer. Additional protective and/or reinforcing layers may be provided. Typically, the protective layer comprises an armoured layer is provided as the outer layer of the hose.

When two convoluted or corrugated layers are provided, insulation may be provided between the two layers. In addition, or instead, a vacuum may be provided in the space between the two layers, in order to provide insulation.

The first and/or second convoluted or corrugated layers may be made of metal, preferably stainless steel.

The hose described above can be manufactured by a method and apparatus, as described further below, which makes it possible to make hose of longer length and diameter than has previously been possible.

According to another aspect of the invention there is provided a method of manufacturing the hose described above comprising sliding a first tubular corrugated or convoluted section along the mandrel, sliding a second corrugated or convoluted section along the mandrel such that it one end of the second corrugated or convoluted section engages one end of the first corrugated or convoluted section, securing the ends of the corrugated or convoluted sections, applying at least one protective and/or reinforcing layer over the corrugated or convoluted sections, applying a respective one of the end fittings to each end of the hose portion, and removing the hose from the mandrel.

The end fittings are preferably applied before removing the hose from the mandrel, although they may in some circumstances be applied after removing the hose from the mandrel.

It will be appreciated that third, fourth, fifth, etc., convoluted or corrugated sections may be slid over the mandrel to create a hose portion of the desired length.

A second convoluted or corrugated layer can be formed, in the same way as the first layer, after the underlying part of the first convoluted or corrugated layer has been formed.

Preferably the mandrel is formed of a paper based material, a wood based material or a plastics polymer based material, such as high density polyethylene, or mixtures thereof. In one particularly advantageous embodiment, the mandrel is cardboard, i.e. a board made of paper pulp.

In the manufacture of bellows hose, it is particularly important to ensure that the mandrel has sufficient bending stiffness to keep it straight enough that adjacent sections can be brought into substantial alignment around substantially the entire circumference of the ends thereof. The ends are usually secured to one another by welding, and if there is not substantial alignment around substantially the entire circumference, the ends will not be properly secured to one another, and there will be an increased risk of failure during use of the hose. To achieve this, in one advantageous embodiment, the mandrel is formed of a material I having a ratio of Young's Modulus (E) to density ($\rho$) in the range 0.1 to 10 GPa·m³/Mg (i.e. giga Pascal×metre³/megagram). Preferably the ratio of E/$\rho$ is greater than 0.3 GPa·m³/Mg, more preferably greater than 0.5 GPa·m³/Mg, and most preferably greater than 0.8 GPa·m³/Mg. Preferably the ratio of E/$\rho$ is less than 10 GPa·m³/Mg, more preferably less than 5 GPa·m³/Mg, and most preferably less than 3 GPa·m³/Mg. Thus, it will be appreciated that the most preferred range of E/$\rho$ is from 0.8 to 3 GPa·m³/Mg.

The values of E/$\rho$ for cardboard and high density polyethylene, which are two materials particularly preferred for the mandrel, are about 1.2 and 1.0 GPa·m³/Mg respectively. The value of E/$\rho$ for the prior art mandrel material, stainless steel, is about 20 GPa·m³/Mg.

In some circumstances, it may be desirable to use composite materials, i.e., fibres disposed within a matrix, as the mandrel. Composite materials have a ratio of E/$\rho$ close to stainless steel, but the density is much lower. Thus, in an alternative embodiment, the material of the mandrel has an E/$\rho$ in the range 20 to 22 GPa·m³/Mg and a density in the range 1.0 to 3.0 Mg/m³. Typically, the composite material comprises carbon, glass or polymeric fibres disposed within a suitable polymeric matrix.

It will, of course be appreciated that, while the mandrel is made of a non-metallic material, it is perfectly possible for the mandrel to include metallic or ceramic fillers. Thus the invention encompasses the use of a cardboard mandrel with a metallic or ceramic filler. The bulk of the mandrel, however, remains non-metallic.

The mandrel may be provided in one continuous length, or it may be provided in a plurality of mandrel sections of shorter length, which are assembled on site to form the completed mandrel. The purpose of this is to facilitate transport of the mandrel.

Typically the mandrel is of substantially cylindrical shape.

The length of the mandrel will typically be approximately 1000 to 2000 mm longer than the length of the hose portion that it is desired to make on the mandrel. The outer diameter of the mandrel will typically be substantially identical to the inner diameter of the hose portion that it is desired to make on the mandrel. Thus, the mandrel will typically have an outer diameter of 200 mm, or 300 mm to 600 mm.

Advantageously, the mandrel is hollow, so that a drive shaft may be disposed longitudinally within the mandrel. In addition, a plug is preferably disposed in at least one end of the mandrel, the arrangement being such that the plug is fixedly secured to the mandrel, whereby rotation of the plug causes rotation of the mandrel. Preferably one of said plugs is disposed in each end of the mandrel. When the mandrel is hollow, the thickness of the mandrel (i.e. the difference between its inner and outer diameter) would typically be about 10 mm to 25 mm.

As discussed above, the non-metallic mandrel should be made of a material which is strong enough that the mandrel can properly support the hose during construction thereof. Furthermore, except for any coating that may be provided on the inner or outer surface of the mandrel, the entire mandrel is preferably made of the same non-metallic material.

The drive shaft is preferably secured to the or each plug, and desirably has a projecting end which can be connected to a drive motor, whereby rotation of the drive shaft causes rotation of the or each plug and thereby rotation of the mandrel. It is a preferred feature of the invention that the mandrel is rotated while part or all of the inner and/or outer structures are arranged in place on the mandrel. Preferably the drive motor is provided with a gearbox.

In an alternative, the drive shaft may not be present, and the rotation of the mandrel may be driven by rotating one plug or both plugs (if present) using the drive motor.

In one preferred embodiment, the mandrel is a sacrificial mandrel, in order to aid removal of the hose from the mandrel. In this embodiment, the hose is removed from the mandrel by sacrificing the mandrel, and removing it from within the hose; any plugs and drive shaft can be removed before sacrificing the mandrel. The mandrel may be sacrificed by, for example, providing it with a pre-weakened area, which can be stressed in order to cause sacrifice of the mandrel; or providing it with a perforation, along which the mandrel can be torn apart; or providing it with a zipper structure, whereby dragging the zipper along the length of the mandrel causes sacrifice of the mandrel. The precise means used to make the mandrel a sacrificial mandrel is conventional, and other conventional techniques not described above could be used instead. It will be noted that sacrifice of the mandrel causes it to be destroyed, which means that it cannot be reused. This is still very economical, as the mandrel according to the invention can be made of an inexpensive recyclable material.

Another technique for removing the mandrel, when the mandrel is made from a material which can be weakened by contact with an appropriately selected fluid, is to wet the mandrel in order to weaken it with the fluid, then to remove the weakened mandrel. One way to wet mandrel is to dip the entire hose and mandrel structure in a tank of the fluid. It is preferred that the fluid is water, but other fluids, such as weak acetic acid or an alcoholic solution may instead be used.

In another preferred embodiment, the mandrel is removed by unscrewing it from the hose. The can desirably be achieved by applying a torque to the drive shaft, while holding the hose against rotation. This technique is particularly suitable when the hose inner structure includes a helical member, as the helical member can create a slight indentation in the mandrel, which aids unscrewing the mandrel from the hose.

It should be noted that rotation of the mandrel is only likely to be beneficial in cases where the convolutions of the bellows are arranged in a spiral. For circumferential convolutions, there is unlikely to be any benefit in providing for rotation of the mandrel, either during construction of the hose, or during removal of the hose from the mandrel.

In an embodiment the mandrel may be pre-coated, prior to assembly of the hose, in order to assist with removal of the completed hose from the mandrel. The pre-coat may serve to reduce the friction between the mandrel and the completed hose.

During construction of the hose, short sections of the bellows may be pulled over the mandrel, then welded together. The welding of the bellows (which may be, e.g., 1-2 mm thick) may cause burning of the mandrel, therefore, to prevent this, it is desirable to provide the mandrel with a heat shield and/or a flame retardant coating on the outer surface thereof.

According to another aspect of the invention there is provided apparatus for manufacturing hose of the type comprising a tubular hose portion extending continuously between two end fittings, wherein said tubular hose portion comprises a plurality of tubular corrugated or convoluted sections secured end to end and at least one protective and/or reinforcing layer disposed around said corrugated or convoluted sections wherein said apparatus comprises a hollow substantially cylindrical non-metallic mandrel, around which the hose may be arranged, a plug disposed at each end of the mandrel, the plugs being fixed to the mandrel, whereby torque applied to the plugs is transmitted to the mandrel to rotate the mandrel about its longitudinal axis, and a drive shaft extending longitudinally along the interior of the mandrel, the drive shaft being connected to the plugs, whereby torque applied to the drive shaft is transmitted to the plugs to rotate the plugs, the drive shaft projecting outwardly from the plugs and mandrel at least one end of the mandrel.

The mandrel preferably has the same construction as the mandrel described above in relation to the method according to the invention.

Preferably, the drive shaft projects outwardly from the plugs and mandrel at each end of the mandrel.

In a preferred embodiment, the apparatus further comprises a drive motor arranged to rotate the drive shaft.

In the prior art, the manufacture of bellows hose is exclusive carried out using carbon steel or, more usually, stainless steel mandrels, and it has not been contemplated that any other materials would be suitable. We have unexpectedly found that other materials are suitable, and that they have many advantages over the prior art. Thus, in 2005, a suitable cardboard mandrel can be obtained at a cost of around: £150, compared with at least £25,000 for a carbon steel mandrel, and at least £75,000 for a stainless steel mandrel. Although the mandrel according to the invention would not normally be used more than once, there is still a considerable saving.

Furthermore, the non-metallic mandrels according to the invention can be removed from the completed hose much more easily than the prior art steel mandrels.

The non-metallic mandrels according to the invention are much lighter than the steel mandrels used in the prior art. This means that they are easier to manipulate and transport. It also means that the non-metallic mandrels do not require the same level of support that is required for steel mandrels. This eases the manufacturing process for the hose.

One particularly important advantage of the mandrel according to the invention is that it is practical to make them longer and/or of greater diameter than the prior art steel mandrels. Thus, as described above, it has not been previously possible to make to make a working bellows or composite hose at lengths above approximately 25 m to 30 m, or at diameters above about 200 mm to 300 mm. A working hose is one which can be used in its normal operating conditions without leaking.

Thus, it has not previously been possible to make working bellows hose, having any significant diameter, in lengths greater than 25 m to 30 m.

Reference is now made to the accompanying drawings, in which.

Figure 1:
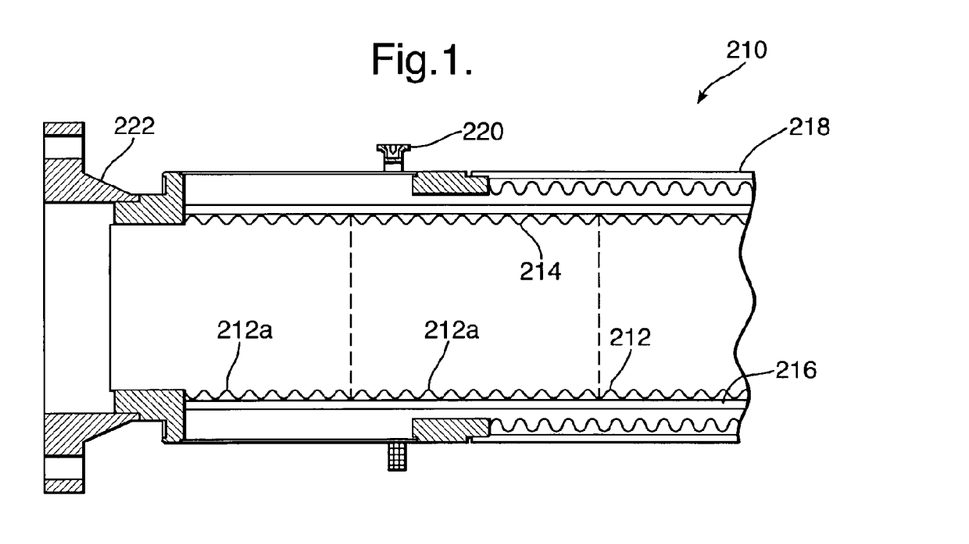
FIG. 1 is a schematic cross-sectional view of a bellows hose according to the invention.

In FIG. 1 a bellows hose in accordance with the invention is generally designated 210.

The hose 210 comprises an inner tubular corrugated layer 212 and an outer tubular corrugated layer 214, each of which is made up of a plurality of corrugated sections 212*a* and 214*a* arranged end to end, and secured to one another. Each layer 212 and 214 is provided with sinusoidal (or U-shaped or .OMEGA. shaped) corrugations. An insulation layer 216 is provided between the bellows 212 and 214. Furthermore, the space between the bellows 212 and 214 is placed in a vacuum, to further improve the insulation. An armoured layer 218 is provided around the outer bellows 214, to improve the insulation further. A pumping port 220 is provided for evacuating air from between the layers 212 and 214 in order to create the vacuum. The hose 210 also includes end fittings 222 at each end of the bellows hose (in FIG. 1, only one end fitting 222 is shown).

Figure 3A:
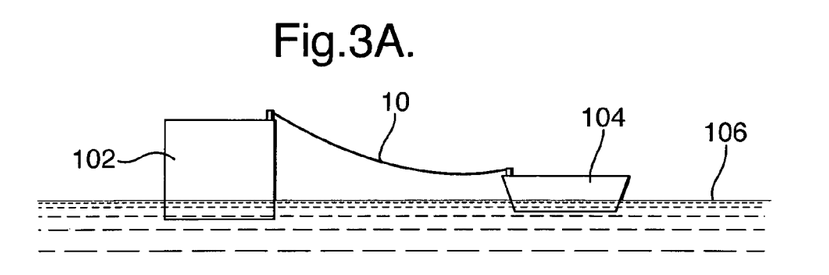
FIGS. 3A, 3B, 3C and 3D show four applications of hose according to the present invention.
Figure 3B:
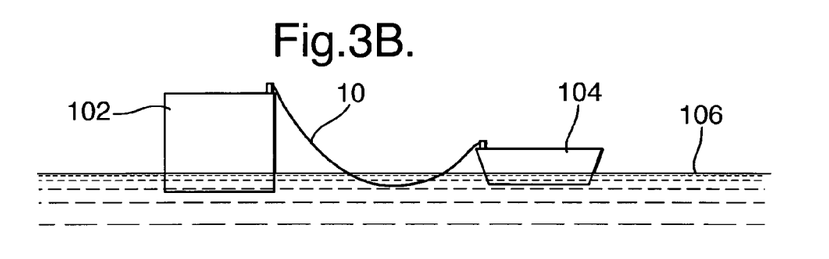
Figure 3C:
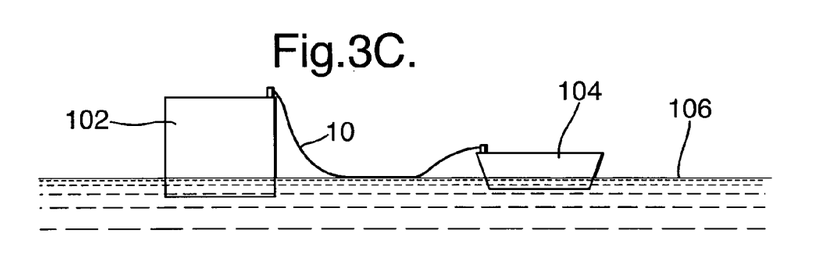
Figure 3D:
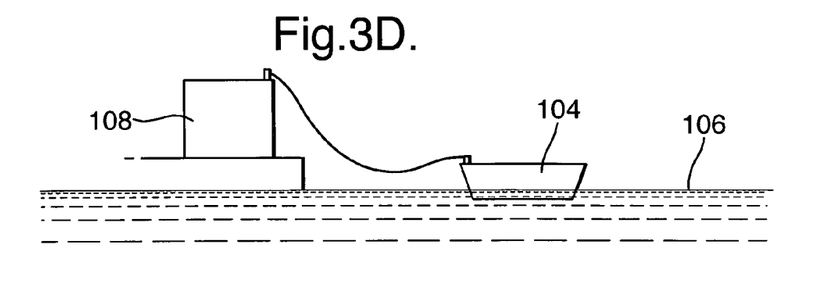

FIGS. 3A to 3D show three applications for the hose 10. In each of FIGS. 3A to 3C a floating production, storage and offloading vessel (FPSO) 102 is linked to a LNG carrier 104 by means of a hose 10 according to the invention. The hose 10 carries LNG from a storage tank of the FPSO 102 to a storage tank of the LNG carrier 104. In FIG. 3A, the hose 10 lies above the sea level 106. In FIG. 3B, the hose 10 is submerged below the sea level 106. In FIG. 3C, the hose 10 floats near the surface of the sea. In each case the hose 10 carries the LNG without any intermediate support. In FIG. 3D the LNG carrier is linked to a land-based storage facility 108 via the hose 10.

The hose 10 may be used for many other applications apart from the applications shown in FIGS. 3A to 3D. The hose may be used in cryogenic and non-cryogenic conditions.

Figure 4:
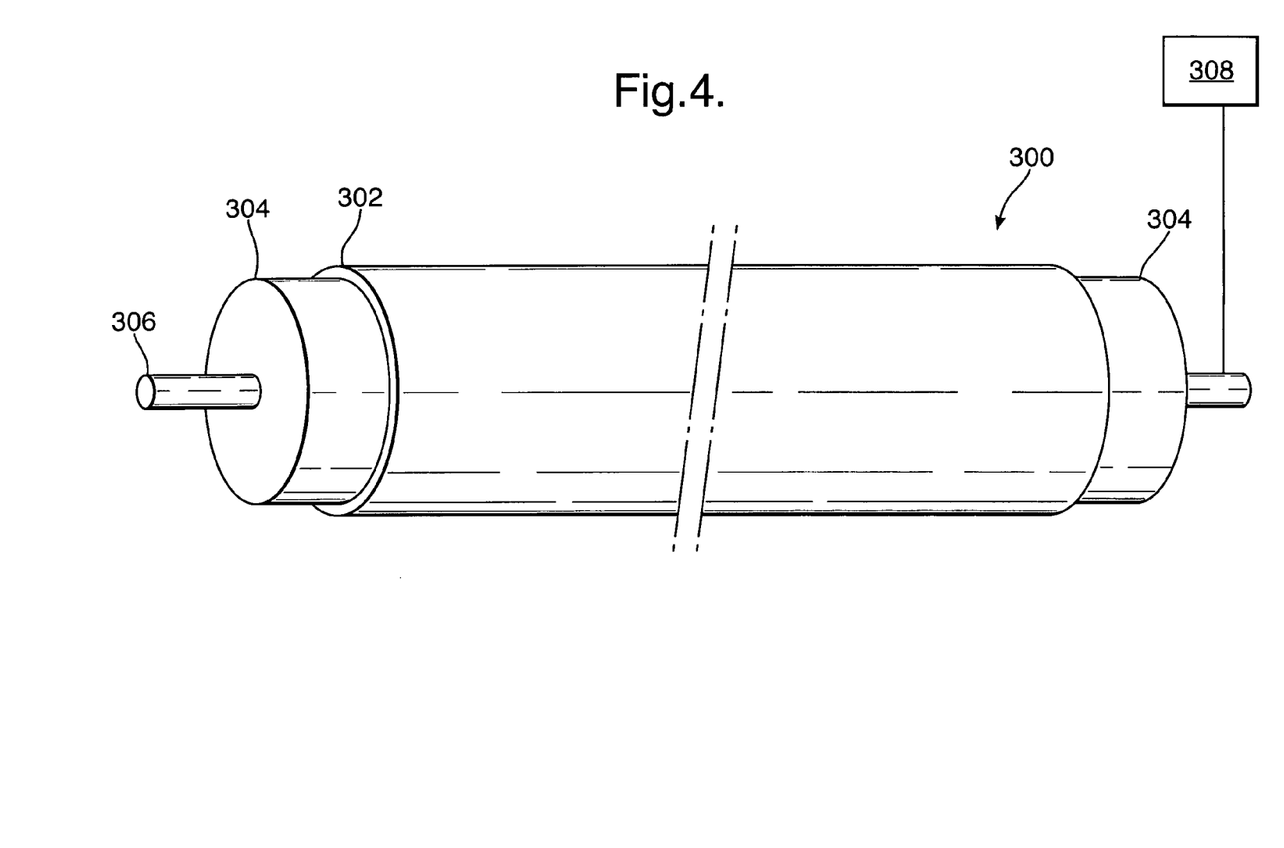
FIG. 4 is a perspective view of an apparatus for use in manufacturing hose, according to the invention.
Figure 5:
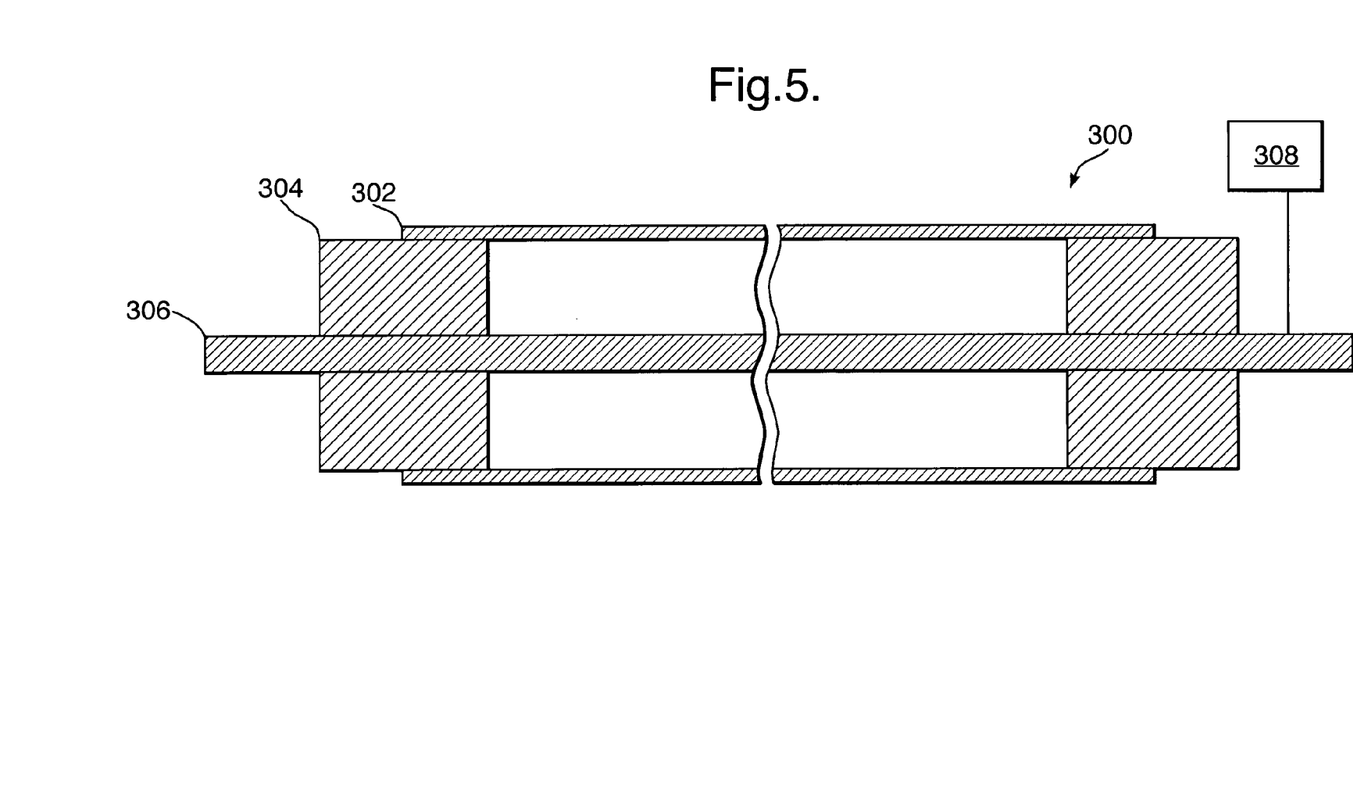
FIG. 5 is a cross-sectional view of the apparatus shown in FIG. 4.

FIGS. 4 and 5 show apparatus 300 according to the invention. The apparatus 300 can be used in the method according to the invention for making the hose according to the invention.

The apparatus 300 comprises a mandrel 302 which has a length and diameter corresponding the desired length and diameter of the hose 10 and 200. The outer diameter of the mandrel 302 corresponds to the inner diameter of the hose 10 or 200. The length of the mandrel 302 is typically about 1-2 m longer than the length of the hose 10 or 200. The mandrel 300 has a substantially circular cross sectional shape, although other shapes may in some circumstances be desirable.

A torque transmitting plug 304 is secured to each end of the mandrel 300, and a drive shaft 306 extends along the length of the mandrel between the plugs 304, and extends outwardly being the ends of the mandrel 302. A drive motor 308, which may be an electric motor, is provided to drive rotation of the drive shaft 306. It will be appreciated that the drive shaft 306 can transmit torque to the plugs 304, which in turn can transmit torque to the mandrel 302 to rotate the mandrel 302. Typically the mandrel will be rotated at a rate of 10-60 rpm.

The application of the hose 210 to the mandrel 300 causes large bending forces to be directed against the mandrel, caused by the weight of the hose 210 along the length of the mandrel 300. Thus, it is important that the mandrel 300 has sufficient bending stiffness that the hose portion can be formed on the mandrel without causing any substantial bending of the mandrel along the longitudinal axis thereof. This is important, because if the mandrel bends, the corrugated or convoluted sections of the hose portion cannot be brought into proper alignment, and cannot be properly secured—this will cause the hose to be more likely to fail during use. One way to select a mandrel of the appropriate bending stiffness is to select an material having an appropriate ratio of Young's Modulus (E) to density ($\rho$), as described above, but other techniques may be apparent to the skilled person.

The manufacture of hose using the apparatus 300 will now be described with reference to the bellows hose 210. Initially, the apparatus 300 is set in place, and the drive motor 308 is operated to rotate the mandrel 302 at the required rate.

Figure 2:
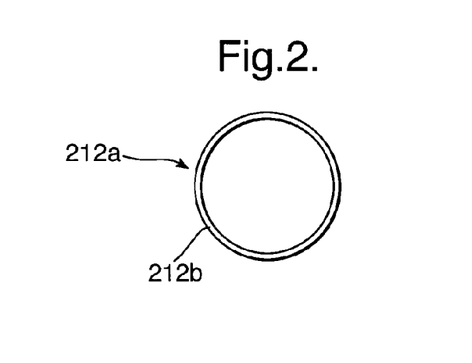
FIG. 2 is a cross sections end view of one of the corrugated layers used in the bellows hose shown in FIG. 1.

As a first step, one of the sections corrugated sections 212a is pulled over the mandrel 302. As noted above, the outer diameter of the mandrel 302 corresponds to the desired internal diameter of the hose 210. A second of the corrugated sections 212a is pulled over the mandrel and into engagement with the first section 212a. The ends of each section 212a are of substantially circular cross section, as depicted in FIG. 2. The mandrel 302 has sufficient bending stiffness that it can support the sections 212a in such a way that substantially the entire circumferential periphery 212b (see FIG. 2) at the abutting ends of the sections 212a are in engagement with one another, so that the ends can be properly secured together, e.g., by welding. Additional sections 212a can be pulled over the mandrel 302 and welded to the rest of the corrugated layer 212 until the desired length has been achieved.

The insulating layer 216 is then wrapped around the inner corrugated layer 212, and the outer corrugated sections 214a are pulled over the insulating layer 216, and may be secured together in the same way as was done for the inner layer 212.

The armoured layer is then pulled over the outer bellows 212. The air between the bellows 212 and 214 is then evacuated using via the pumping port 220. The end fittings 222 are then applied to the ends of the hose 210.

When the end fittings 222 are in place, the hose 210 may be removed from the mandrel 302 by any desired means. In one embodiment, the mandrel 302 may simply be destroyed, for example by tearing. In another embodiment, the drive motor 308 is operated to rotate the mandrel 302 to cause the mandrel 302 to unscrew from the hose 210.

After the hose 210 has been removed from the mandrel 302, the mandrel 302 may be discarded. The plugs 304, the drive shaft 306 and the drive motor 308 may be retained for use with another mandrel 302.

It will be appreciated that the invention described above may be modified within the scope of the claims.

The invention claimed is:

1. A method of manufacturing a bellows hose that comprises a tubular hose portion having an inner diameter of at least 200 mm, a length greater than 25 m, and extending continuously between two end fittings, wherein the tubular hose portion comprises a plurality of tubular corrugated or convoluted sections secured end to end and at least one protective and/or reinforcing layer disposed around the corrugated or convoluted sections, wherein the method comprises:
   a. sliding a first tubular corrugated or convoluted section along a non-metallic hollow mandrel, wherein
      i. the mandrel is formed from a material selected from the group consisting of (I) a material having a ratio of Young's Modulus (E) to density ($\rho$) E/$\rho$ in the range 0.1 to 10 GPa·m$^3$/Mg and (II) a material having a ratio of Young's Modulus (E) to density ($\rho$) E/$\rho$ in the range from 20 to 22 GPa·m$^3$/Mg and a density in the range 1.0 to 3.0 Mg/m, and
      ii. the mandrel has an outer diameter of at least 200 mm
   b. sliding a second corrugated or convoluted section along the mandrel such that one end of the second corrugated or convoluted section engages one end of the first corrugated or convoluted section,
   c. securing the ends of the corrugated or convoluted sections,
   d. applying at least one protective and/or reinforcing layer over the corrugated or convoluted sections,
   e. applying a respective one of the end fittings to each end of the hose portion, and
   f. removing the hose from the mandrel.

2. A method according to claim 1, wherein the mandrel has sufficient bending stiffness to keep it straight enough that adjacent corrugated or convoluted sections of the hose portion can be brought into substantial alignment around substantially the entire circumference of the ends thereof prior to securing the corrugated or convoluted sections together.

3. A method according to claim 2, wherein the mandrel is formed of a paper based material, a wood based material or a plastics polymer based material, or mixtures thereof.

4. A method according to claim 2, wherein the mandrel is cardboard.

5. A method according to claim 1, wherein the mandrel is formed of a material having a ratio of Young's Modulus (E) to density ($\rho$) E/$\rho$ in the range from 0.8 to 3 GPa·m$^3$/Mg.

6. A method according to claim 1, wherein the mandrel is of substantially cylindrical shape.

7. A method according to claim 1, wherein the mandrel is hollow and further comprising a drive motor operatively connected with the mandrel 8. A method according to claim 7, wherein a plug is disposed in at least one end of the mandrel, whereby rotation of the plug causes rotation of the mandrel.

9. A method according to claim 8, further comprising a drive shaft secured to the plug and having a projecting end that can be connected to a drive motor, whereby rotation of the drive shaft causes rotation of the or each plug and thereby rotation of the mandrel.

10. A method according to claim 1, wherein the mandrel is a sacrificial mandrel, in order to aid removal of the hose from the mandrel.

11. A method according to claim 1, wherein the mandrel is pre-coated, prior to assembly of the hose, in order to assist with removal of the completed hose from the mandrel.

12. A method according to claim 1, wherein the mandrel has an outer diameter of at least 300 mm.

13. A method according to 1 wherein the mandrel is stationary.

* * * * *